(12) United States Patent
Licata et al.

(10) Patent No.: US 12,361,003 B2
(45) Date of Patent: Jul. 15, 2025

(54) SYSTEMS AND METHODS FOR PERFORMING ENTITY BASED DATA SEARCHES BETWEEN ENTERPRISES

(71) Applicant: SAP SE, Walldorf (DE)

(72) Inventors: John Licata, New York, NY (US); Thomas Klingbeil, Potsdam (DE); Lukasz Ostrowski, Berlin (DE); Benjamin Stoeckhert, Oberursel (DE); Upendra Barve, Berlin (DE); Anna Zhikhareva, Berlin (DE); Marco Cigaina, Vimercate (IT); Thomas Waltering, Wiesloch (DE)

(73) Assignee: SAP SE, Walldorf (DE)

( * ) Notice: Subject to any disclaimer, the term of this patent is extended or adjusted under 35 U.S.C. 154(b) by 9 days.

(21) Appl. No.: 18/326,598

(22) Filed: May 31, 2023

(65) Prior Publication Data

US 2024/0403297 A1    Dec. 5, 2024

(51) Int. Cl.
*G06F 16/2455* (2019.01)
*G06F 16/2453* (2019.01)
*G06F 16/2457* (2019.01)
*G06F 16/248* (2019.01)

(52) U.S. Cl.
CPC .... *G06F 16/2455* (2019.01); *G06F 16/24542* (2019.01); *G06F 16/24578* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 11,880,377 B1 * | 1/2024 | Tsang | G06F 16/242 |
| 2014/0372423 A1 * | 12/2014 | Majumder | G06F 16/9536 707/725 |
| 2015/0286723 A1 * | 10/2015 | Sun | G06F 40/295 707/706 |
| 2019/0205472 A1 * | 7/2019 | Kulkarni | G06F 3/04812 |
| 2020/0241854 A1 * | 7/2020 | Stojanovic | G06F 16/435 |

OTHER PUBLICATIONS

U.S. Patent Application entitled "Decision Simulator Using a Knowledge Graph" U.S. Appl. No. 17/986,777, filed Nov. 14, 2022, 50 pages.

* cited by examiner

*Primary Examiner* — Debbie M Le
(74) *Attorney, Agent, or Firm* — Fountainhead Law Group, PC

(57) ABSTRACT

Embodiments of the present disclosure include techniques for establishing connections between entities for collaboration and potential co-innovation. In one embodiment, the present disclosure includes a search technique including an entity defined search model. A verified user may upload information into a search model to influence search results. Searching involves finding information about entities that may be good matches for potential collaboration. Searches may be performed iteratively to populate categories of information about potential target entities to determine whether a connection to such target entities may be made to pursue collaborative activities.

18 Claims, 7 Drawing Sheets

SYSTEMS AND METHODS FOR
PERFORMING ENTITY BASED DATA
SEARCHES BETWEEN ENTERPRISES

BACKGROUND

The present disclosure relates generally to data analysis and data retrieval, and in particular, to systems and methods for performing searches between enterprises to support collaborative innovation.

Innovation is often seen as one dimensional with limited input from different backgrounds and perspectives. The shifting landscape of the global employment market means that finding innovative workers with specialty skills will only become even more difficult. Slow innovation weighs on corporate culture that does little to tap into fresh ideas or effective shared meaning. Creative employees are not often tapped to engage with communities to explore new avenues of opportunity. Community and collaborative tools for promoting innovation are currently limited.

Co-innovation requires disparate and potentially unconnected actors to be able to find each other to generate new ideas and address specific problems. However, current connector technologies are very limited and siloed. Social networks currently do not offer mechanisms for unconnected actors to connect and co-innovate around a common problem space. Connected actors, such as teammates at a particular company working on a problem, often start the innovation process by performing traditional web searches (e.g., using Google® Search or Bing®) to gather information and formulate the problem space and potential solutions. However, current search technology returns pages of often unrelated information not relevant to the problem at hand. Moreover, current search technology does not allow a sufficient level of influence on the search space or the format of the results returned. Accordingly, traditional search techniques do not address the needs of collaborative co-innovation by previously unconnected actors.

The present disclose is directed to techniques for improving co-innovation using a search technology designed to connect unconnected actors and provide rich context for establishing a foundation for collaboration and co-innovation.

DETAILED DESCRIPTION

Described herein are techniques for data collection and analysis among other features. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
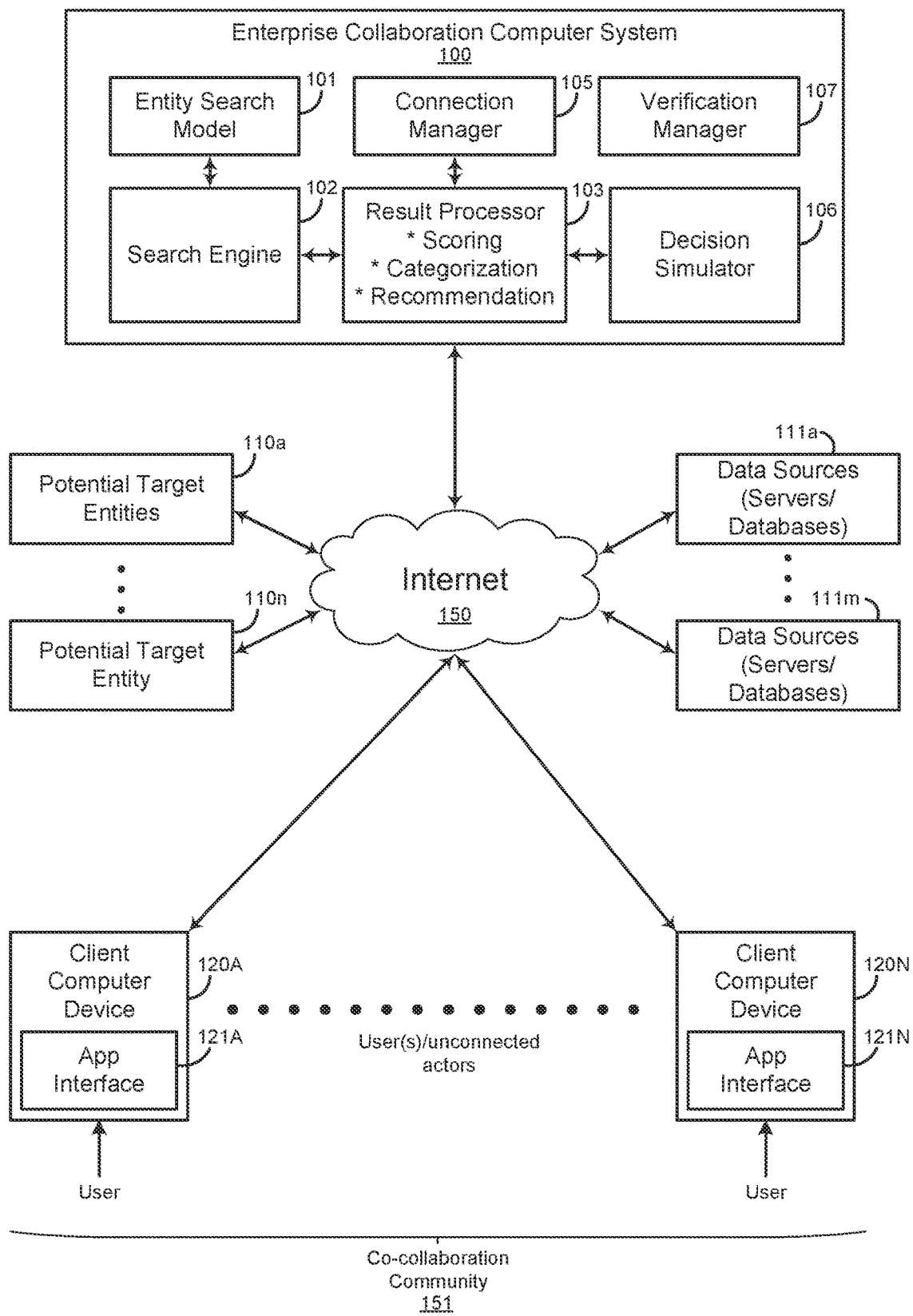
FIG. 1 illustrates a co-collaboration system for searching and retrieving data according to an embodiment.

FIG. 1 illustrates an enterprise collaboration system 100 according to an embodiment. Features and advantages of the present disclosure include search capabilities that return extensive context targeted for establishing connections and potential collaborations. Embodiments of the disclosure marry and advance limited existing techniques available for search (e.g., Google®) and social networks (e.g., LinkedIn®), for example, to provide a foundation to nearly limitless opportunities to collaborate and co-innovate not currently available with existing solutions. System 100 includes a search engine 102, which may search the Internet (the Web), Intranet, or any other network for information. Uniquely, search queries may be based on an entity search model 101. Entity search model 101 may be defined by an entity, such as a corporation, for example, to obtain particular types of results. Search model 102 may be defined by a user (e.g., a verified user authorized by the entity) so that the search returns very specific results and/or uses particular search terms or algorithms for carrying out the search to produce the kinds of results useful for forming collaborative connections as described in more detail herein. An entity search model 101 may include categories of information to be obtained about potential target entities that the user deems beneficial in establishing a collaborative connection. Entity search model 101 may include specified parameters, such as financial information, projects, goals, key performance indicators, competencies, and product information (e.g., in the form of structure or unstructured documents or text), for example, to be searched and obtained in search results. Traditionally, searches are performed using user histories or data gathered by search companies about users, but searches traditionally are not influenced heavily by the user both in terms of what to search for (categories and other parameters defined in a model) and targeted toward generating results useful for collaboration and/or co-innovation, for example.

Searches may be initiated by users of client computer devices 120A-N, for example, such as desktop, laptop, or mobile computers, such as mobile phones or tablet computers, for example. Client computer devices 120A-N may include an application (App) 121A-N that presents a user interface (UI) for interfacing with enterprise collaboration computer system 100. Users may be verified users that belong to the entity. Verification of users for the entity or potential contacts/individuals at a target entity may be verified in a verification manager 107 included in system 100, for example. Verification may be an important aspect of some embodiments to ensure collaboration and connectivity between entities is limited and secure so that any co-innovation that occurs is safeguarded between the entities, for example. Accordingly, verification manager 107 may verify a user performing a search as well as individuals identified as a result of the search, establish a secure data communication channel between the user and individual, and control restrictions on the flow of information between persons at the entities (e.g., privacy, nondisclosure agreements, contractual terms, terms of collaboration, etc. . . . ). Embodiments of verification manager 107 may include management of transactions or assets, such as NFTs, for example. Users accessing system 100 through applications 121A-N (including individuals at target entities who may already be part of the system or invited to join) may form a co-collaboration community 151, for example.

Search queries (aka, searches) are entered by users into system 100. Searches based on the search model 101 may be performed across the Internet 150. A wide variety of data sources 111a-m (websites, servers, databases, etc. . . . ) may be analyzed for search results matching the search query using a wide variety of web search algorithms adapted to use the techniques described herein. Searches are configured to include potential target entities 110a-n. Potential target entities 110a-n may include other organizations (e.g., companies) that are well matched with the search query and search model, for example, where the entity the searching user is associated with may be well matched, to varying degrees, for collaboration and co-innovation with one or more potential target entities. Search results are returned to a result processor 103. As described in more detail below, result processor 103 may generate scores for the potential target entities, associate search results with various categories specified in the search model parameters, and generate recommendations. A search may return a plurality of target entities, and data from the search results associated with the target entities. The data may be categorized for each target entity based on categories specified in the parameters. For example, financial data about an identified target entity may be associated with the target entity. Similarly, information about projects, goals, customer satisfaction, key performance indicators, and other information about a target entity returned during the search may be associated with the target entity. The information, scores, and recommendations may be formatted, filtered, and presented to a user so that the user has a deep contextual framework to understand each target entity and decide whether or not to establish a connection to the target entity.

In some embodiments, data for one or more target entities is extracted from the search results and formatted for an application program interface to a decision simulator 106. Decision simulator 106 may generate a probability distribution based on data from the search results. A probability distribution gives the probabilities of occurrences of different possible outcomes. Search results may be formatted for input to decision simulator 106 to produce a range of outcome probabilities, which may be useful in determining whether a connection should be established with a target entity. An example decision simulator is disclosed in currently pending, commonly owned U.S. patent application Ser. No. 17/986,777, the contents of which are incorporated herein by reference. In some embodiments, when scores are above a threshold and probabilities are above a threshold, invitations to connect may be made automatically without user intervention, for example, with context describing opportunities for collaboration and co-invention being included in the invitation.

Figure 2:
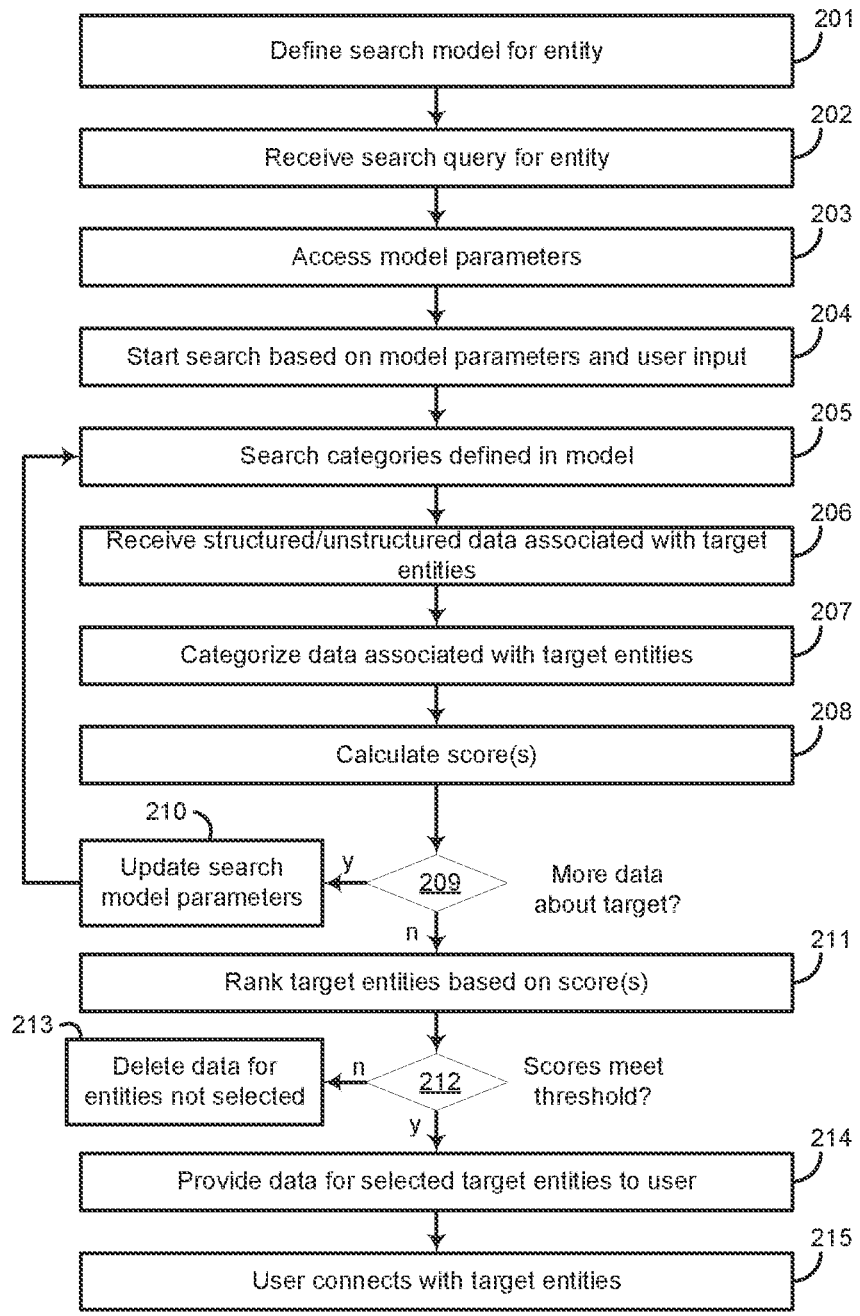
FIG. 2 illustrates a co-collaboration method for searching and retrieving data according to an embodiment.

FIG. 2 illustrates a co-collaboration method for searching and retrieving data according to an embodiment. A search model for an entity is defined at 201. At 202, a search query is received for an entity (e.g., from a verified user associated with the entity). Model parameters are accessed at 203. This may involve accessing structured or unstructured documents uploaded into the system to provide context for the search, including entity goals, KPIs, project information, and the like. Search engine 102 may retrieve and parse the search model and combine the search model with user input to formulate the search query. At 204, the search is started based on the model parameters and user input. Model parameters may advantageously be used as "givens" for a variety of searches performed by the user, for example, to influence the search process. As mentioned above, the model may include parameters specifying categories. At 205, the categories in the model are searched. At 206, structured and unstructured data associated with target entities is received in response to the search. At 207, the data associated with each of the target entities is categorized. A data structure may be established for each target entity that associates particular search results with each category and with a particular target entity, for example. At 208, scores are calculated. In one embodiment, a score is calculated for each target entity. The score may correspond to a degree of match (e.g., a percentage match), for each target entity, between the user's search query and the search model with the data in the search results associated with the target entity. In some embodiments, an additional score may be calculated based on social factors. For example, a "social" score may be based on customer reviews, customer satisfaction, a degree of social media engagement, information about the target entity related to particular goals (e.g., the environment or other objectives), for example. In some embodiments, social factors may be included in the model to influence the social score.

Features and advantages of the present disclosure include one or more secondary searches to obtain more context about each target entity to provide a rich contextual framework for determining if a connection should be established for collaboration and/or co-innovation. At 209, the system determines if more data about the target entities is to be obtained (e.g., one or more categories has insufficient results, the score is too low, etc. . . . ). At 210, the search model parameters may be updated using the initial search results (e.g., target entity names may be included in the search to narrow down the results). The system may then perform one or more subsequent (secondary) searches. Steps 209 and 210 may occur without user input or intervention. Secondary searches may be performed for each category specified in the search model, for example.

At 211, the target entities are ranked based on one or more scores (e.g., either or both of a matching score and a social score). At 212, the scores are compared with a threshold and data for target entities that do not meet the threshold may be deleted at 213, while data for target entities that meet the threshold may be formatted and provided to a user at 214. At 215, the user is connected with the target entity (e.g., either manually, or automatically in some cases).

Figure 3:
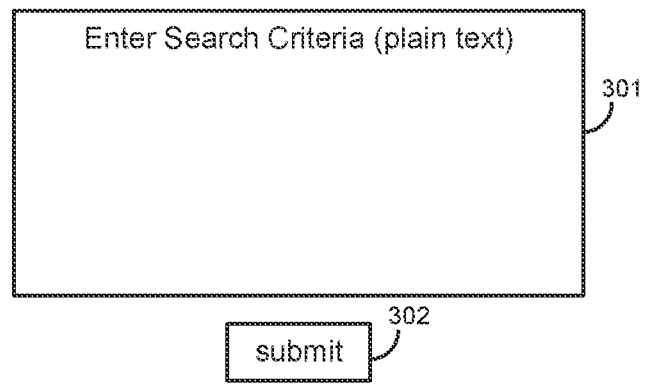
FIG. 3 illustrates an example user interface for searching and retrieving data according to an embodiment.

FIGS. 3-6 illustrate example user interfaces (UIs) for presenting search results to a user to establish connections for collaboration or co-innovation. As illustrated in FIG. 3, a user is presented with a search box 301. A user may enter plain text into the search box and hit submit button 302. For example, a user may enter: "I want to make sustainability a key driver for my Project X with the next 6 months with these parameters: 2050 agenda, SDG 6—clean water, Medium size partner, Local, My Q2 objectives, numbers, and KPIs," which may reference documents uploaded into the system as part of the search model, for example. "Medium sized partner" and "Local" may supplement parameters in the search model, for example.

Figure 4:
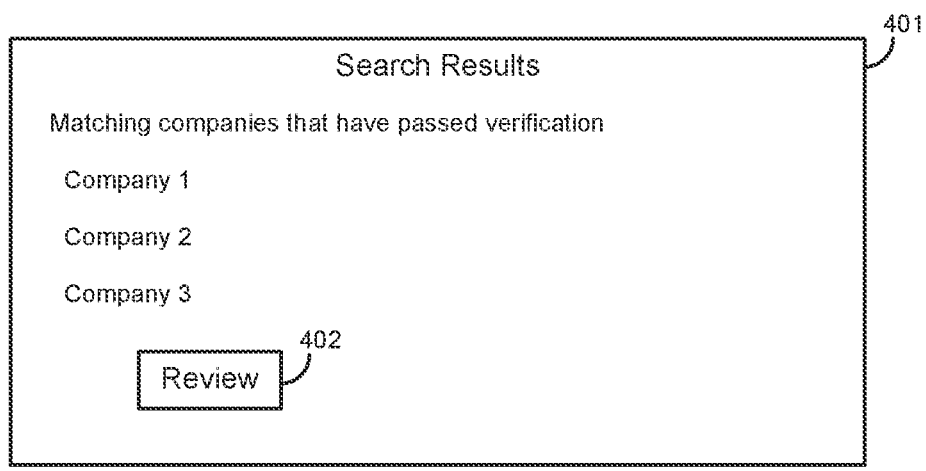
FIG. 4 illustrates an example of search results according to an embodiment.

FIG. 4 illustrates the presentation of search results. Entities in this example are companies. In this example, matching companies that have passed verification and have high enough scores are presented to a user at 401. A user may review the company's associated data by selecting "Review" button 402.

Figure 5:
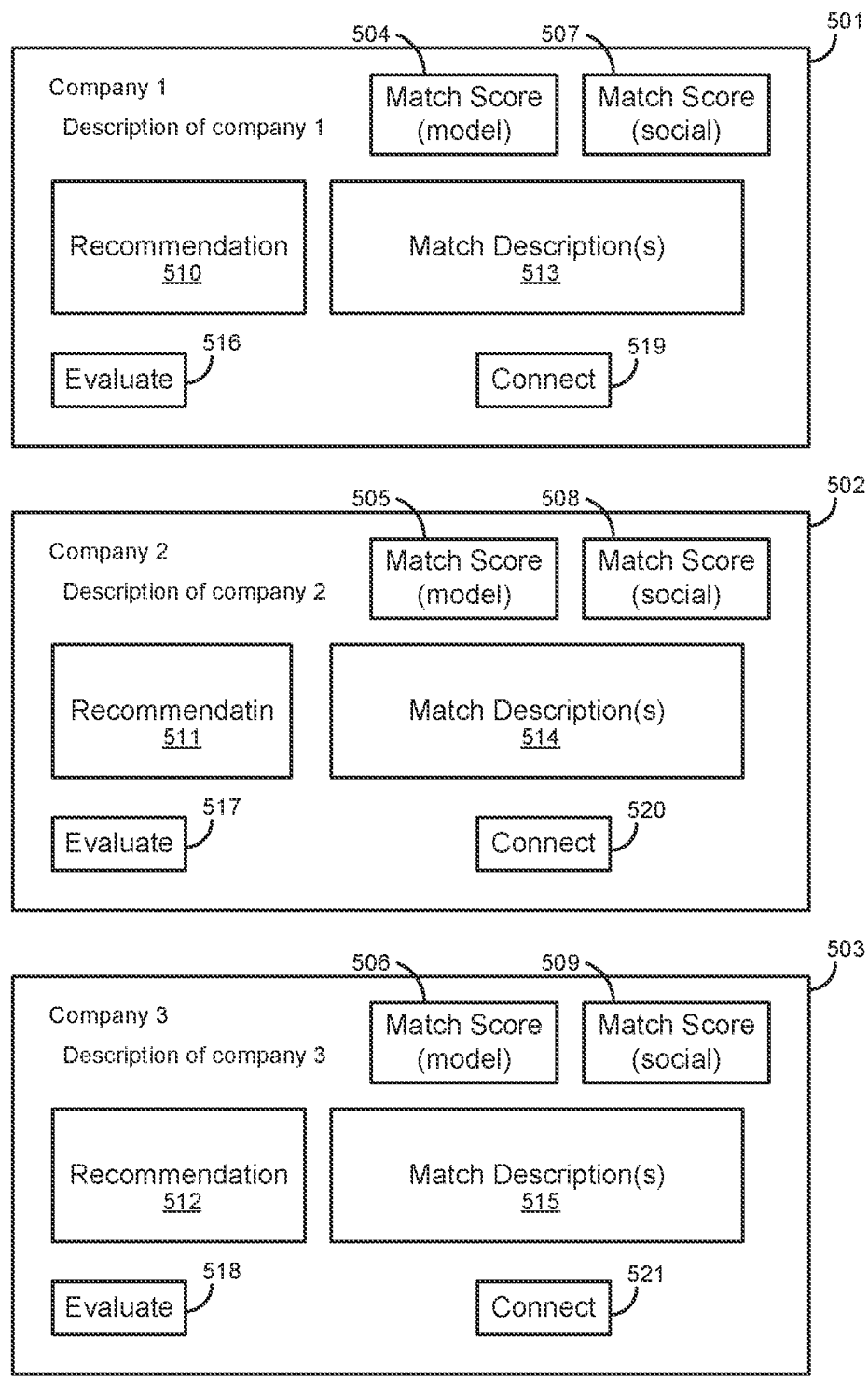
FIG. 5 illustrates another example of search results according to an embodiment.

FIG. 5 illustrates a more detailed summary of the search results for each entity. In this example, the companies with the top 3 scores are shown at 501-503. Each company summary is displayed in the UI with the match score (e.g., a percentage) based on the search model 504-506, a social score 507-509, a recommendation 510-512 (e.g., Customer X could benefit from Company's clean water manufacturing processes), and match descriptions 513-315 (e.g., Sustainable housing services by Company, match Entity's efforts for society 5.0. Explore fit with other Entity clients). In various embodiments, search results associated with target entities may include unstructured data mapped to goals, initiatives, projects, or other opportunities of the searching entity. Accordingly, the UI summary in FIG. 5 may have a variety of unstructured data (e.g., text) notes designating potential points of connection, commonality, and opportunity between the target entity and the searching entity to foster a connection, for example. A user may explore more data associated with each entity by selecting one of the "Evaluate" buttons 516-518. Alternatively, a user may connect with the target company by selecting one of the "Connect" buttons 519-521.

Figure 6:
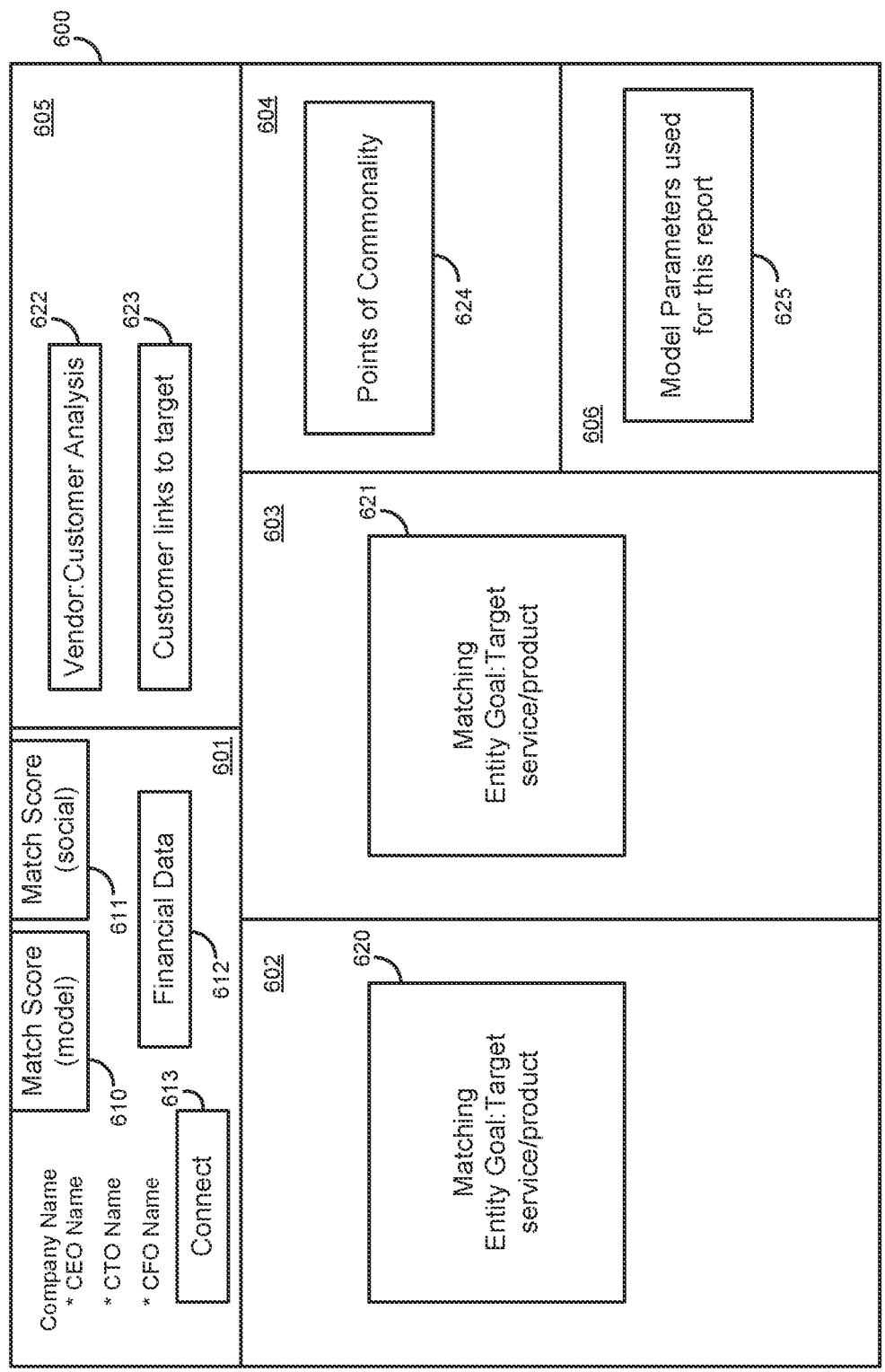
FIG. 6 illustrates yet another example of search results according to an embodiment.

FIG. 6 illustrates a detailed data presentation UI 600 for a target entity. Data may be presented based on categories in particular areas 601-605. UI portion 601 may include contact information, financial information 612, and scores 610-611 for the company. Financial information may be obtained about the company using a secondary search, for example. Contact information, including company leadership, may be obtained using a focused secondary search. Information about the CEO, CTO, and CFO, for example may be retrieved using a focused secondary search (e.g., of the company's website or Linkedin®). UI portion 602 may include a searching entity's goal matching to a target entity product/service. For example, data displayed may include "searching entity's project X's customer Y could benefit from Company 1's clean water engineering. The new membrane technology involves nano-particles" and related information. UI portion 602 may similarly include detailed connections between the entities returned by the search. Portion 602 may include the following search result data: "Sustainable housing services by Company 1, match your efforts in society 5.0 agenda—by your strategy memo from May 23, 2023. Company 1 helps their customer, Company Z, that specializes in prefabricated homes, which utilize green building practices, and are efficiently produced to provide a healthy living experience." Images retrieved as part of the search results may be displayed.

UI portion 604 may display points of commonality. For example, portion 604 may display: SDG 6 [Clean Water] is a shared investment between you and Company 1," with further information about the intersection of commonality between the searching entity and target entity, for example. UI portion 605 may display vendor: customer analysis 622 and customer links to target entity 623. For example, UI portion 605 may display the following search results: "Formal Supplier Evaluation—3 existing customers from your existing portfolio may also benefit from Company 1's solutions. Consider adding Company 1 to your approved suppliers list."

Finally, UI portion 606 may display the model parameters used in the search 625 to generate the data. A user may connect 613 with the target entity based on an analysis of the data in UI 600.

Figure 7:
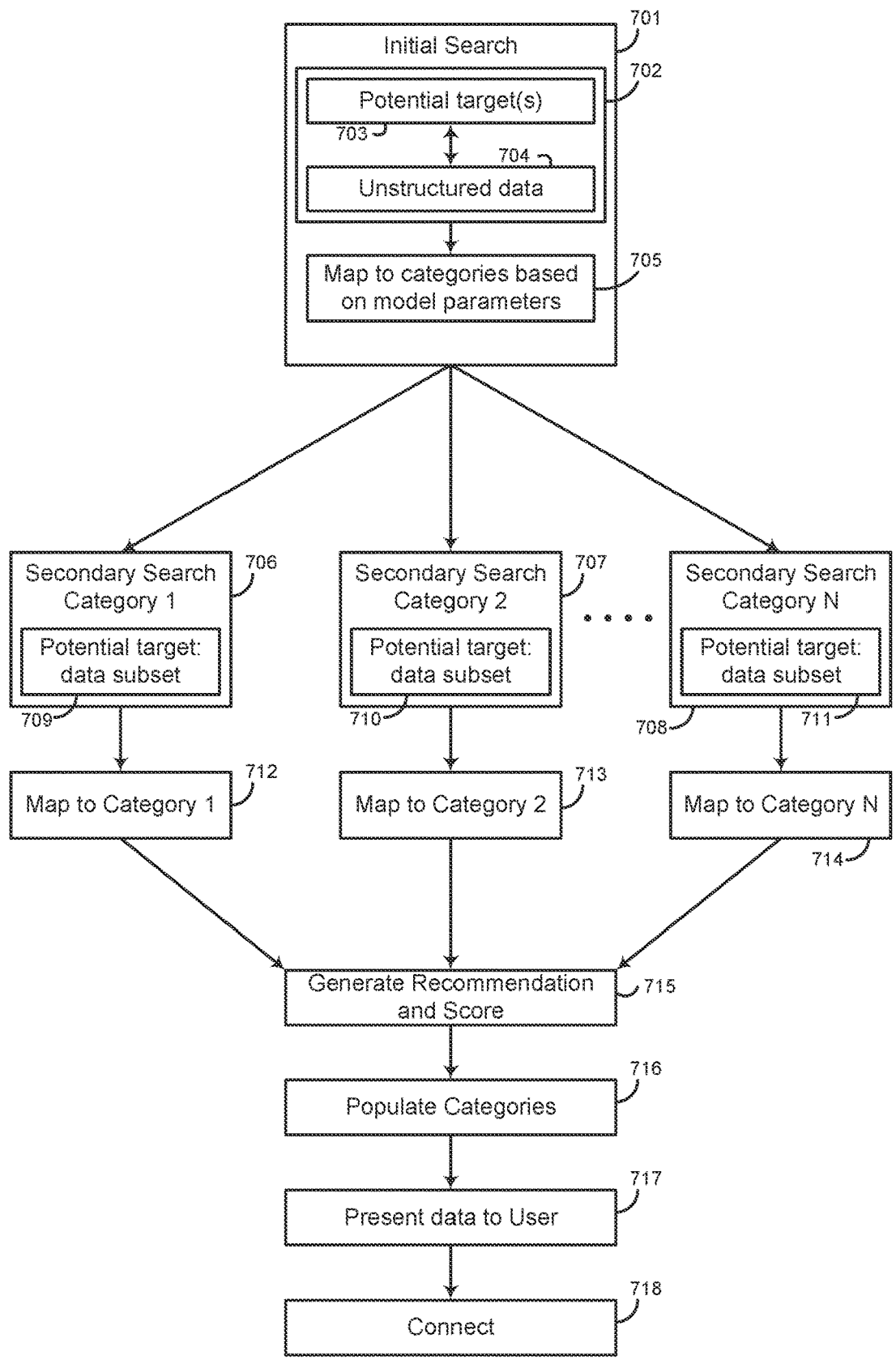
FIG. 7 illustrates searching using secondary searches of categories according to an embodiment.

FIG. 7 illustrates searching using secondary searches of categories according to an embodiment. Embodiments of the present disclosure may perform iterative searches where data obtained in a previous search (e.g., target entity data) is used to refine subsequent searches. Secondary searches may be configured to search for particular categories of information, for example. An initial search 701 may produce search results 702 comprising potential target entities 703 associated with unstructured data 704. The unstructured data may be mapped to categories based on model parameters at 705 (e.g., financial information about a company may be mapped to a financial category based on a parameter "Total Revenue"). Secondary searches 706-708 may be performed to obtain additional information about each category using the potential target entity and associated data for each category (if any) 709-711, obtained from a previous search, to focus the secondary search, for example. Search results of the secondary search are then mapped to each category at 712-714, which may include predefined fields in each category required to be filled in to obtain a valid search result, for example.

Once the data for the various categories is obtained, scores and recommendations (e.g., including points of commonality, opportunities, overlaps, and the like) may be generated at 715. At 716, the categories are populated with retrieved data associated with each category. At 717, the data is presented to a user, as illustrated in the UIs in FIGS. 4-6, for example. At 718, a user may establish a connection with one or more of the entities.

Example Hardware

Figure 8:
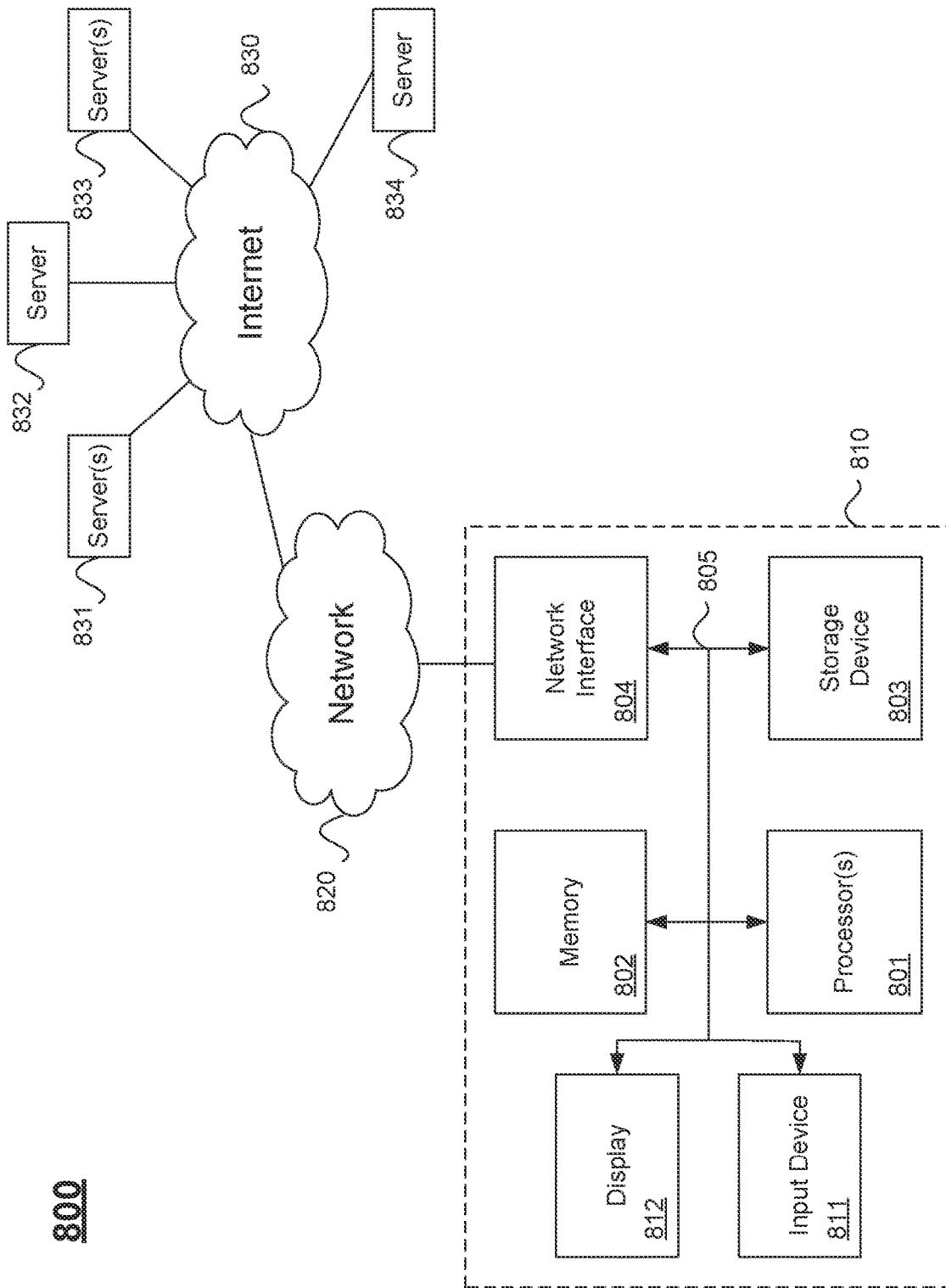
FIG. 8 illustrates hardware of a special purpose computing machine configured according to the above disclosure.

FIG. 8 illustrates hardware of a special purpose computing machine configured according to the above disclosure. The following hardware description is merely one example. It is to be understood that a variety of computers topologies may be used to implement the above described techniques. An example computer system 810 is illustrated in FIG. 8. Computer system 810 includes a bus 805 or other communication mechanism for communicating information, and one or more processor(s) 801 coupled with bus 805 for processing information. Computer system 810 also includes memory 802 coupled to bus 805 for storing information and instructions to be executed by processor 801, including information and instructions for performing some of the techniques described above, for example. Memory 802 may also be used for storing programs executed by processor(s) 801. Possible implementations of memory 802 may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 803 may include source code, binary code, or software files for performing the techniques above, for example. Storage device 803 and memory 802 are both examples of non-transitory computer readable storage mediums (aka, storage media).

In some systems, computer system 810 may be coupled via bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized buses for coupling various components of the computer together, for example.

Computer system 810 also includes a network interface 804 coupled with bus 805. Network interface 804 may provide two-way data communication between computer system 810 and a local network 820. Network 820 may represent one or multiple networking technologies, such as Ethernet, local wireless networks (e.g., WiFi), or cellular networks, for example. The network interface 804 may be a wireless or wired connection, for example. Computer system 810 can send and receive information through the network interface 804 across a wired or wireless local area network, an Intranet, or a cellular network to the Internet 830, for example. In some embodiments, a front end (e.g., a browser), for example, may access data and features on backend software systems that may reside on multiple different hardware servers on-prem 831 or across the Internet 830 on servers 832-835. One or more of servers 832-835 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

In one embodiment, the present disclosure includes a computer-implemented search and information retrieval method comprising: storing a search model for an entity, the search model specifying parameters; receiving a search query from a user; accessing, during the search query, the search model to retrieve the parameters; executing the search based on the search query and the parameters to produce search results including a plurality of potential target entities; calculating one or more scores corresponding to the search query and parameters matching, at least in part, the search results for the potential target entities; ranking the potential target entities; selecting a subset of the potential target entities for display to a user; and displaying the potential target entities to the user.

In one embodiment, the search results comprise contact information for individuals at the potential target entities, the method further comprising connecting the user and one or more of the individuals at the potential target entities.

In one embodiment, the present disclosure further comprises automatically verifying the individuals at the potential target entities.

In one embodiment, the parameters specified in the search model comprise a plurality of categories, the method further comprising: receiving initial search results comprising the potential target entities; mapping the initial search results to the plurality of categories; and executing, without additional user input, a plurality of secondary search queries, each secondary search query based on a particular category, particular initial search results mapped to the particular category, and one of the potential target entities, wherein the search results are based on the search query and the plurality of secondary search queries.

In one embodiment, the present disclosure further comprises mapping the search results to the plurality of categories.

In one embodiment, the present disclosure further comprises generating at least one recommendation based on the search results mapped to the plurality of categories.

In one embodiment, the one or more scores are based on the search results mapped to the plurality of categories.

In one embodiment, at least one category is a social category and a first score of the one or more scores is a social score calculated based on search results mapped to the social category.

In one embodiment, the ranking is based on the social score and another score calculated based on search results mapped to a plurality of categories.

In one embodiment, the parameters comprising: financial information, projects, goals, key performance indicators, competencies, and product information.

In one embodiment, the search model is user defined.

In various embodiments, the techniques described herein may be implemented in software on a computer system comprising at least one processor and at least one non-transitory computer readable medium storing computer executable instructions that, when executed by the at least one processor, cause the computer system to perform the above methods described herein. In other embodiments, the techniques described herein may be embodied in a non-transitory computer-readable medium storing computer-executable instructions that, when executed by at least one processor, perform the above methods described herein.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A computer-implemented search and information retrieval method comprising:
    storing a search model for an entity, the search model specifying parameters;
    receiving a search query from a user;
    accessing, during the search query, the search model to retrieve the parameters;
    executing the search based on the search query and the parameters to produce search results including a plurality of potential target entities;
    calculating one or more scores corresponding to the search query and parameters matching, at least in part, the search results for the potential target entities;
    ranking the potential target entities;
    selecting a subset of the potential target entities for display to a user; and
    displaying the potential target entities to the user,
    wherein the parameters specified in the search model comprise a plurality of categories, the method further comprising:
    receiving initial search results comprising the potential target entities;
    mapping the initial search results to the plurality of categories; and
    executing, without additional user input, a plurality of secondary search queries, each secondary search query based on a particular category, particular initial search results mapped to the particular category, and one of the potential target entities,
    wherein the search results are based on the search query and the plurality of secondary search queries.

2. The method of claim 1, wherein the search results comprise contact information for individuals at the potential target entities, the method further comprising connecting the user and one or more of the individuals at the potential target entities.

3. The method of claim 2, further comprising automatically verifying the individuals at the potential target entities.

4. The method of claim 1, further comprising mapping the search results to the plurality of categories.

5. The method of claim 4, further comprising generating at least one recommendation based on the search results mapped to the plurality of categories.

6. The method of claim 4, wherein the one or more scores are based on the search results mapped to the plurality of categories.

7. The method of claim 4, wherein at least one category is a social category and a first score of the one or more scores is a social score calculated based on search results mapped to the social category.

8. The method of claim 7, wherein the ranking is based on the social score and another score calculated based on search results mapped to a plurality of categories.

9. The method of claim 1, the parameters comprising: financial information, projects, goals, key performance indicators, competencies, and product information.

10. The method of claim 1, wherein the search model is user defined.

11. A computer system comprising:
at least one processor;
at least one non-transitory computer readable medium storing computer executable instructions that, when executed by the at least one processor, cause the computer system to perform a method comprising:
storing a search model for an entity, the search model specifying parameters;
receiving a search query from a user;
accessing, during the search query, the search model to retrieve the parameters;
executing the search based on the search query and the parameters to produce search results including a plurality of potential target entities;
calculating one or more scores corresponding to the search query and parameters matching, at least in part, the search results for the potential target entities;
ranking the potential target entities;
selecting a subset of the potential target entities for display to a user; and
displaying the potential target entities to the user,
wherein the parameters specified in the search model comprise a plurality of categories, the method further comprising:
receiving initial search results comprising the potential target entities;
mapping the initial search results to the plurality of categories; and
executing, without additional user input, a plurality of secondary search queries, each secondary search query based on a particular category, particular initial search results mapped to the particular category, and one of the potential target entities,
wherein the search results are based on the search query and the plurality of secondary search queries.

12. The computer system of claim 11, wherein the search results comprise contact information for individuals at the potential target entities, the method further comprising connecting the user and one or more of the individuals at the potential target entities.

13. The computer system of claim 11, further comprising mapping the search results to the plurality of categories.

14. The computer system of claim 13, further comprising generating at least one recommendation based on the search results mapped to the plurality of categories.

15. The computer system of claim 13, wherein the one or more scores are based on the search results mapped to the plurality of categories.

16. The computer system of claim 13, wherein at least one category is a social category and a first score of the one or more scores is a social score calculated based on search results mapped to the social category.

17. The computer system of claim 16, wherein the ranking is based on the social score and another score calculated based on search results mapped to a plurality of categories.

18. A non-transitory computer-readable medium storing computer-executable instructions that, when executed by at least one processor, perform a method, the method comprising:
storing a search model for an entity, the search model specifying parameters;
receiving a search query from a user;
accessing, during the search query, the search model to retrieve the parameters;
executing the search based on the search query and the parameters to produce search results including a plurality of potential target entities;
calculating one or more scores corresponding to the search query and parameters matching, at least in part, the search results for the potential target entities;
ranking the potential target entities;
selecting a subset of the potential target entities for display to a user; and
displaying the potential target entities to the user,
wherein the parameters specified in the search model comprise a plurality of categories, the method further comprising:
receiving initial search results comprising the potential target entities;
mapping the initial search results to the plurality of categories; and
executing, without additional user input, a plurality of secondary search queries, each secondary search query based on a particular category, particular initial search results mapped to the particular category, and one of the potential target entities,
wherein the search results are based on the search query and the plurality of secondary search queries.

* * * * *